US009306223B2

(12) United States Patent
Swift

(10) Patent No.: US 9,306,223 B2
(45) Date of Patent: Apr. 5, 2016

(54) ELECTROLYTE MATERIALS, THERMAL BATTERY COMPONENTS, AND THERMAL BATTERIES FOR INTERMEDIATE TEMPERATURE APPLICATIONS

(75) Inventor: Geoffrey Swift, Joplin, MO (US)

(73) Assignee: EAGLEPICHER TECHNOLOGIES, LLC, Joplin, MO (US)

( * ) Notice: Subject to any disclaimer, the term of this patent is extended or adjusted under 35 U.S.C. 154(b) by 296 days.

(21) Appl. No.: 13/240,350

(22) Filed: Sep. 22, 2011

(65) Prior Publication Data

US 2013/0078528 A1 Mar. 28, 2013

(51) Int. Cl.
*H01M 6/36* (2006.01)

(52) U.S. Cl.
CPC ........ *H01M 6/36* (2013.01); *H01M 2300/0014* (2013.01)

(58) Field of Classification Search
CPC ............... H01M 2300/0048; H01M 2300/002; H01M 2300/006; H01M 2300/0065; H01M 2300/0068; H01M 10/24; H01M 10/26; H01M 10/399
USPC .......................................................... 429/112
See application file for complete search history.

(56) References Cited

U.S. PATENT DOCUMENTS 3,350,226 A * 10/1967 Lieb et al. ..................... 429/414
3,471,330 A * 10/1969 Berger et al. ................. 429/112
4,041,217 A * 8/1977 Collins ......................... 429/112
4,117,206 A * 9/1978 Plust et al. .................... 429/101

FOREIGN PATENT DOCUMENTS

FR 2 304 187 10/1976
GB 1 536 481 12/1978

OTHER PUBLICATIONS

Baikov, “Solid-Hydroxide-Proton Conductors in New Electrochemical Cells ‘Hydrogenated Metal-Protonics’,” Solid State Ionics, vol. 181, pp. 545-550, 2010.
Sep. 4, 2013 European Search Report issued in European Application No. 12185554.8.

* cited by examiner

*Primary Examiner* — Maria J Laios
(74) *Attorney, Agent, or Firm* — Sutherland Asbill & Brennan LLP

(57) ABSTRACT

A eutectic formulation of KOH and NaOH is used as an electrolyte or an electrolyte-separator. An anode, and/or a cathode can contain the eutectic formulation of KOH and NaOH. A battery can contain an electrolyte-separator, an anode, and/or a cathode with the eutectic formulation of KOH and NaOH. The electrolyte in the electrolyte-separator can have a melting point from about 170° C. to about 300° C. making it suitable for use in a thermal battery that does not require a pyrotechnic device for certain high-temperature applications.

27 Claims, 3 Drawing Sheets

100

| | |
|---|---|
| | CURRENT COLLECTOR |
| ANODE | 102 |
| ELECTROLYTE-SEPARATOR | 104 |
| CATHODE | 106 |
| | CURRENT COLLECTOR |

ELECTROLYTE MATERIALS, THERMAL BATTERY COMPONENTS, AND THERMAL BATTERIES FOR INTERMEDIATE TEMPERATURE APPLICATIONS

BACKGROUND

The field of this disclosure generally relates to electrolyte material for use in thermal batteries. The disclosure also relates to composites of electrodes and electrolytes that contain the electrolyte material, and to batteries that contain the electrolyte material and/or a cathode and/or an anode that contain the electrolyte material.

Thermal batteries tend to have relatively long shelf lives, high energy densities, require relatively low maintenance, and can withstand relatively high temperatures. Thermal batteries also tend to provide a short burst of power over a relatively short period of time. The burst may range from less than a second to an hour or more, with power typically ranging from about a watt or less to kilowatts. Such properties make thermal batteries suitable for military (e.g., batteries for missile guidance systems) and space exploration applications. Thermal batteries may also be used in other applications, such as in electric vehicles.

A typical thermal battery includes an anode, a cathode, an electrolyte-separator containing a solid electrolyte that is non-conductive at ambient temperature, and a pyrotechnic material (e.g., heat pellet, which may contain, for example, Fe—$KClO_4$ powder) that provides a heat source to the battery. When battery operation is desired, an external stimulus is applied to the battery. For example, an electrical current may be applied to the battery to set off an electric match or an electro-active squib, or a mechanical force (e.g., mechanical shock) may be applied to set off a concussion primer. The external stimulus causes the pyrotechnic material to ignite and begin to heat. Heat produced from the pyrotechnic material causes the previously solid electrolyte to melt and become conductive, which allows the battery to provide power for a desired application.

The anodes of thermal batteries are generally formed of an alkali or alkaline earth metal or alloy. A typical anode includes lithium metal or a lithium alloy, such as lithium aluminum, lithium silicon, or lithium boron.

Electrolytes for use with thermal batteries often include a eutectic mixture (i.e., a mixture which melts at a temperature lower than each of the individual components) of lithium chloride and potassium chloride and a binder (such as MgO, fumed silica or kaolin), which assists in containing the electrolyte within the thermal battery assembly upon melting, such as by capillary action, surface tension, or both. With typical thermal battery electrolytes, a binder prevents the electrolyte material from dispersing throughout the battery, which would cause undesired shunts or short circuits in the cell. Unfortunately, the binder materials tend to be relatively resistant to ionic conduction and thus inclusion of the binder may increase the impedance of the battery.

Cathode materials for thermal batteries may vary in accordance with a variety of design parameters and generally include a metal oxide or metal sulfide. By way of example, iron oxide ($Fe_3O_4$), iron disulfide ($FeS_2$) or cobalt disulfide ($CoS_2$) are often used as cathode materials.

Thermal batteries are often formed using pellet techniques, such that each of the electrolyte, cathode, and heat source are formed into a wafer. In this case, the respective cell component chemicals are processed into powders and the powders are pressed together to form the wafer (or pellet). Each component may be formed as a discrete part, or the anode and/or cathode may include (i.e., be flooded with) electrolyte material to improve the conductivity of that component. The electrolyte material in the anode and cathode may or may not contain binder material.

A thermal battery may consist of a single series of stacked cells or two or more parallel stacks of the series of stacked cells. The cell stack(s) may be insulated as thoroughly as possible, placed in a container, which may be made of stainless steel, and the container is sealed to form a hermetic seal, such as by welding. Electrical connections may be provided through standard glass to metal seals.

Silver oxide zinc (SOZ) batteries generally comprise an $Ag_2O$ or AgO cathode and a Zn anode. The electrolyte commonly used in SOZ batteries is an aqueous solution of KOH or NaOH. SOZ batteries have a high energy density, allow for flexible configurations, have excellent voltage regulations, and have been proven to be safe and reliable. However, SOZ batteries generally only have a two to five year shelf life, and SOZ batteries generally operate at low temperatures, such as between 4° C. and 70° C. Thus, SOZ chemistry has not been used in thermal batteries due, at least in part, to the above deficiencies.

A continuing need exists for reliable lower-temperature thermal battery materials. A continuing need also exists for primary batteries, such as thermal batteries, that incorporate such materials and exhibit such improved performance.

SUMMARY

Improved electrolyte material for use in thermal batteries including cathodes and anodes thereof are provided. In general, a eutectic formulation of KOH and NaOH used as an electrolyte in an electrolyte-separator, in an anode, and/or in a cathode is provided that imparts the reliability and performance of an SOZ battery to thermal batteries.

In an aspect, an electrolyte is provided that comprises a eutectic formulation of KOH and NaOH. The eutectic formulation may comprise about 57 wt % KOH and about 43 wt % NaOH.

In another aspect, an electrolyte-separator is provided that comprises a eutectic formulation of KOH and NaOH. The eutectic formulation may comprise about 57 wt % KOH and about 43 wt % NaOH. The electrolyte-separator may comprise a binder, such as MgO. The electrolyte-separator may comprise about 20 wt % to about 50 wt % of the binder relative to the entire weight of the electrolyte-separator.

In another aspect, a cathode is provided that comprises a eutectic formulation of KOH and NaOH. The eutectic formulation may comprise about 57 wt % KOH and about 43 wt % NaOH. The cathode may also comprise other materials, such as $Ag_2O$, $PbO_2$, and $MnO_2$. The cathode may comprise about 70 wt % to about 85 wt % of the other material, relative to the entire weight of the cathode. The cathode may or may not include a binder.

In another aspect, an anode is provided that comprises a eutectic formulation of KOH and NaOH. The eutectic formulation may comprise about 57 wt % KOH and about 43 wt % NaOH. The anode may also comprise other materials, such Zn. The anode may comprise about 70 wt % to about 90 wt % of the other material, relative to the entire weight of the anode. The anode may or may not include a binder.

In another aspect, a thermal battery is provided that comprises an anode, a cathode, and an electrolyte-separator. At least one of the anode, cathode, and electrolyte-separator comprises a eutectic formulation of KOH and NaOH.

The electrolyte-separator and electrodes using a eutectic formulation of KOH and NaOH may provide a battery or battery element with an electrolyte melting point from about 170° C. to about 300° C., which makes the battery or battery element suitable for use as a thermal battery or battery element without the need for a pyrotechnic or other activation mechanism in certain high-temperature applications. The 170° C. to 300° C. electrolyte melting point is much lower than the electrolyte melting point of conventional thermal batteries.

There are various refinements of the features noted in relation to the above-mentioned aspects. Further features may also be incorporated in the above-mentioned aspects. The above aspects, refinements, and additional features may exist individually or in any combination. For instance, various features discussed below in relation to any of the illustrated embodiments may be incorporated into any of the above-described aspects of the present disclosure, alone or in any combination.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF EMBODIMENTS

Figure 1:
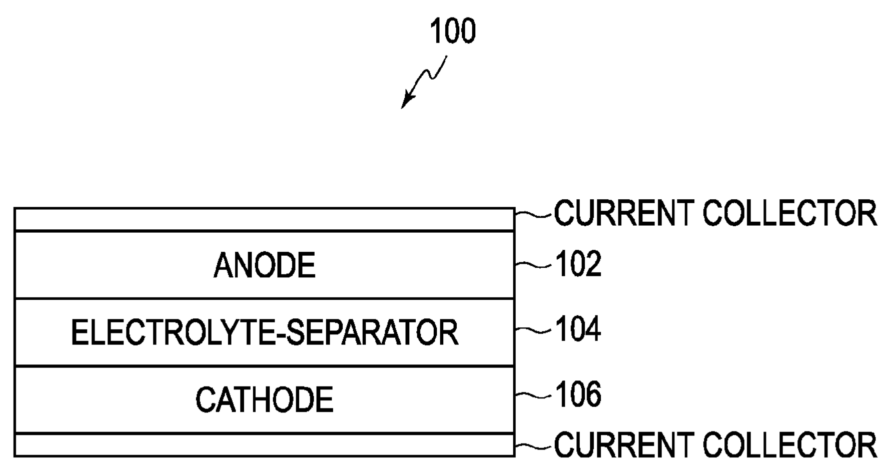
FIG. 1 illustrates an electrochemical device in accordance with various embodiments of the present disclosure.

The present disclosure generally relates to electrolyte formulations suitable for inclusion in components of thermal batteries and to batteries including the electrolyte material. FIG. 1 illustrates a thermal battery 100, in accordance with various embodiments, and includes an anode 102, an electrolyte-separator 104, and a cathode 106. The electrolyte material of the present disclosure is suitable as a constituent in any or all of these battery components.

As used herein, an "electrochemical device" may otherwise be referred to as a battery (and in some embodiments, a "thermal battery"), a capacitor, a cell, an electrochemical cell, or the like. It should be understood that these references are not limiting, and any device that involves electron transfer between an electrode and an electrolyte is contemplated within the scope of the present disclosure. Further, an electrochemical device may refer to single or multiple connected electrochemical devices, electrochemical cells, batteries or capacitors capable of supplying energy to a load, and none of the references herein to any particular device should be considered to limit the disclosure in any way. In one or more embodiments of the present disclosure, the electrochemical device is a thermal battery.

Thermal battery 100 components may be prepared by consolidating powders via a mechanical pressing operation to produce pellets (i.e., wafers). Thermal batteries using pressed components may be prepared by assembling, in stacks, the various components, such as the anode 102, electrolyte-separator 104, and cathode 106, and, optionally, a heat source pellet if applicable to the particular battery design and application. Assembly of one each of anode 102, electrolyte-separator 104, and cathode 106 comprises a single electrochemical cell. Multiple cells may be stacked in series to produce a thermal battery. In this regard it should be understood that thermal battery designs other than as shown in FIG. 1 may be used without departing from the scope of the present disclosure. In addition, methods other than powder consolidation into pellets to be stacked may be used for thermal battery construction. This may include methods such as tape casting, web coating or pasting operations to obtain pellets or non-pellet components such as those used in jelly-roll batteries.

A eutectic formulation of KOH and NaOH may be used as an electrolyte in an electrolyte-separator, a cathode, and/or an anode. In various aspects, the eutectic formulation of KOH and NaOH may include KOH from about 7 wt % to about 85 wt % and may include NaOH from about 15 wt % to about 93 wt %. For example, a weight ratio of KOH to NaOH may be: about 40:60 wt %; such as about 41:59 wt %; about 42:58 wt %; about 43:57 wt %; about 44:56 wt %; about 45:55 wt %; about 46:54 wt %; about 47:53 wt %; about 48:52 wt %; about 49:51 wt %; about 50:50 wt %; about 51:49 wt %; about 52:48 wt %; about 53:47 wt %; about 54:46 wt %; about 56:44 wt %; about 57:43 wt %; about 58:42 wt %; about 59:41 wt %; about 60:40 wt %; about 61:39 wt %; about 62:38 wt %; about 63:37 wt %; about 64:36 wt %; or about 65:35 wt %.

The eutectic formulation of KOH and NaOH used as an electrolyte in an electrolyte-separator, a cathode, and/or an anode may have a melting point from about 170° C. to about 330° C. For example, the eutectic formulation of KOH and NaOH may have a melting point from about 160° C. to about 315° C., from about 160° C. to about 310° C., from about 165° C. to about 305° C., from about 170° C. to about 300° C., from about 175° C. to about 295° C., from about 180° C. to about 290° C., from about 185° C. to about 285° C., from about 190° C. to about 280° C., from about 195° C. to about 275° C., from about 200° C. to about 270° C., from about 205° C. to about 265° C., from about 210° C. to about 260° C., from about 215° C. to about 255° C., from about 220° C. to about 250° C., from about 225° C. to about 245° C., from about 230° C. to about 240° C., or about 235° C.

A eutectic formulation with such a melting point may be used as an electrolyte in an electrolyte-separator, in a cathode, and/or in an anode of a thermal battery. The relatively low melting point of the eutectic formulation may allow the above thermal battery components to activate (e.g., melt) during high-temperature applications, such as, for example, down-hole mining operations, without the need of a pyrotechnic device, or other activation component.

An electrolyte-separator may be formed by physically mixing the desired ratio of KOH and NaOH (KOH/NaOH eutectic) with a binder (e.g., MgO, $Y_2O_3$, $Al_2O_3$, BN, AlN, fumed silica, or clay minerals such as kaolinite (including kaolin clays which are known to be rich in kaolinite)), optionally fusing the mixed KOH/NaOH eutectic and binder at a high temperature (e.g., about 300° C.±50° C.), grinding the fused KOH/NaOH eutectic and binder, and optionally passing the ground product through a sieve.

Any desired amount of binder may be used in the electrolyte-separator. In one aspect, the electrolyte-separator may contain at least 30% by weight of the binder relative to the total weight of the electrolyte-separator. In embodiments, the electrolyte-separator may contain, for example: about 5% by weight; about 10% by weight; about 15% by weight; about 20% by weight; about 25% by weight; about 30% by weight; about 35% by weight; about 36% by weight; about 37% by weight; about 38% by weight; about 39% by weight; about 40% by weight; about 41% by weight; about 42% by weight; about 43% by weight; about 44% by weight; about 45% by weight; about 50% by weight; or about 55% by weight, binder relative to the total weight of the electrolyte-separator.

The starting materials may be either in powder or granulated form and may be dried at a temperature sufficient to remove an amount of absorbed moisture (if any). Moisture may be removed as much as economically practical and as much as practical in view of the selected manufacturing process. Generally, the amount of moisture should be reduced to a level that does not cause unacceptable amounts of anode material oxidation or deliquescence of either NaOH or KOH. The electrolyte-separator starting materials may be heated, for example, to a temperature of from about 100° C. to about 300° C., to remove moisture from the material.

Physical mixing may proceed via any mechanical mixing method, for example, stirring the starting materials by hand, agitating the ingredients in a Turbula blender, rolling the container on a jar mill, or the like. Mixing may proceed from 15 minutes to about 2 hours, depending on the total amount of starting materials and the manner of mixing.

After the mixing is completed, the mixed powder may be removed from the mixing container and placed into a crucible suitable for fusing the KOH/NaOH eutectic and binder material at high temperature. Exemplary crucibles may be formed of refractory material that is able to withstand the high temperatures required to fuse the KOH/NaOH eutectic and binder material and be resistant to the corrosive effects of the molten electrolyte-separator material. The KOH/NaOH eutectic and binder material are fused at a temperature sufficient to melt the bulk of the mixture such as, for example, at least about 200° C. or at least about 300° C. or even at least about 350° C. The fusing process may form a homogenous mixture of the KOH/NaOH eutectic and the binder. Depending on the ratio of KOH to NaOH, only a portion of the mixture might fully melt during the fusing process.

After fusing, the resulting fused KOH/NaOH eutectic material and binder may be ground. Grinding may take place either by hand using a mortar-pestle for small amounts, or using a large grinder, such as a quaker mill, for large amounts. After grinding, the ground KOH/NaOH eutectic material may be passed through a screen to remove any large particles that were missed in the grinding step. The large particles may be ground a second time to reduce their size to pass through the screen. Mesh size of the screen is variable according to the preferences of the user and the intended application.

Generally, the size of the particles of the ground electrolyte-separator is not critical. However, the particle size should be consistent with typical battery manufacturing operations as dependent on the battery design as appreciated by those of skill in the art. For example, tape casting methods generally use smaller particles than pellet pressing methods. When pellet pressing methods are used to form the electrolyte-separator, the electrolyte-separator particles should be screened such that they are sufficiently small to allow proper filling of the die, but yet large enough so that they do not infiltrate the gap between the punch and the die. In tape casting methods, the particles should be sufficiently small to allow casting of a thin tape. Suitable particle size ranges may be readily determined by those of skill in the art.

The resulting powder, after mixing, fusing, grinding, and sieving, may then be pressed into pellets (i.e., wafers) for use as electrolyte-separator. The pellets may be formed by a hydraulic press in which the powder material is introduced into a pellet die and leveled (either mechanically or by hand). A hydraulic punch is lowered and compresses the powder into a pellet (i.e., wafer). Pelletizing pressures are not critical; however, it is preferred to use pressures near the highest capable pressures in the pelletizing equipment within the mechanical limits of the equipment (e.g., the punch and die materials).

Anode materials may include any material suitable for use in SOZ batteries. The anode may include zinc or zinc alloys, such as Ba—Zn, Ca—Zn, Cd—Zn, Ce—Zn, Mg—Zn, Ni—Zn, Sb—Zn, or Yb—Zn alloys. The zinc or zinc alloy is typically in a powdered form. To improve performance of a thermal battery, for example, extend the life of the battery for a given amount of anode material, the anode may be "flooded" to form an anode-electrolyte composite wherein electrolyte is mixed with the anode material powder and is part of the anode pellet that is pressed. The flooding allows ions to flow not just from the inner edge of the anode but also from the bulk of the anode pellet.

Where the anode is flooded, the anode-electrolyte composite may be formed by mixing the KOH/NaOH eutectic and the anode material by any mechanical mixing method, for example, stirring the starting materials by hand, agitating the ingredients in a Turbula blender, rolling the container on a jar mill, or the like. Mixing may proceed from 15 minutes to about 2 hours, depending on the total amount of starting materials and the manner of mixing.

In one aspect, the anode-electrolyte composite may comprise at least 10 wt % KOH/NaOH eutectic relative to the total weight of the anode-electrolyte composite. For example, the anode-electrolyte composite may comprise: about 10 wt %; about 11 wt %; about 12 wt %; about 13 wt %; about 14 wt %; about 15 wt %; about 16 wt %; about 17 wt %; about 18 wt %; about 19 wt %; about 20 wt %; about 21 wt %; about 22 wt %; about 23 wt %; about 24 wt %; about 25 wt %; about 30 wt %; about 35 wt %; about 40 wt %; about 45 wt %; or about 50 wt % KOH/NaOH eutectic relative to the total weight of the anode-electrolyte composite. The anode comprising the KOH—NaOH eutectic component may or may not contain binder material.

The anode material or mixed anode-electrolyte composite may be pressed into pellets (i.e., wafers) for use as an anode. The pellets may be formed by a hydraulic press in which the powder material is introduced into a pellet die and leveled (either mechanically or by hand). A hydraulic punch is lowered and compresses the powder into a pellet (i.e., wafer). Pelletizing pressures are not critical; however, it is preferred to use pressures near the highest capable pressures in the pelletizing equipment within the mechanical limits of the equipment (e.g., the punch and die materials).

Cathode materials may be prepared in the same or similar manner as anode materials, such that powders are mixed and pressed. In accordance with various embodiments of the disclosure, the cathode includes a metal (e.g., Ag, Pb, or Mn) or a metal oxide (e.g., $Ag_2O$, $PbO_2$, $MnO_2$) as the active material in the cathode.

Similar to anode powders, cathode powders may be mixed with an electrolyte to provide a flooded cathode to improve battery performance. Where the cathode is flooded, a cathode-electrolyte composite may be formed by mixing a KOH/NaOH eutectic and the cathode material by any mechanical mixing method. In one aspect, the cathode-electrolyte composite may comprise at least 15 wt % KOH/NaOH eutectic relative to the total weight of the cathode-electrolyte composite. For example, the cathode-electrolyte composite may comprise: about 15 wt %; about 16 wt %; about 17 wt %; about 18 wt %; about 19 wt %; about 20 wt %; about 21 wt %; about 22 wt %; about 23 wt %; about 24 wt %; about 25 wt %; about 26 wt %; about 27 wt %; about 28 wt %; about 29 wt %; about 30 wt %; about 31 wt %; about 32 wt %; about 33 wt %; about 34 wt %; about 35 wt %; or about 40 wt %; or about 45 wt %; or about 50 wt % KOH/NaOH eutectic relative to the total weight of the cathode-electrolyte composite. The cathode material or mixed cathode-electrolyte material may then be pressed into a pellet (i.e., wafers) for use as a cathode. The KOH—NaOH eutectic component may or may not contain binder material.

Once the pressed components are consolidated into pellets, thermal batteries may be prepared by assembling, in stacks, the various components including the anode 102, electrolyte-separator 104, and cathode 106. A heat source pellet may optionally be added to the stacks if applicable to the particular battery design. Assembly of one each of anode 102, electrolyte-separator 104, and cathode 106 comprises a single cell. Multiple cells may be stacked in series to produce a thermal battery. If the battery is to be used in an environment having a temperature at or above the melting temperature of the electrolyte-separator 104, it is not necessary to include a heat source pellet.

EXAMPLES

The following non-limiting examples set forth below are illustrative of various aspects of certain exemplary embodiments of the present disclosure. The compositions, methods and various parameters reflected therein are intended only to exemplify various aspects and embodiments of the disclosure, and are not intended to limit the scope of the claims.

Example 1

Testing a Cell Having an Electrolyte-Separator and Cathode Comprising a KOH and NaOH Eutectic Formulation A thermal battery is prepared using a eutectic formulation of KOH and NaOH having a KOH to NaOH ratio of 56.9:43.1 wt %, as an electrolyte material.

An electrolyte-separator is prepared by weighing the above ratio of KOH and NaOH and adding an MgO binder at 40 wt % relative to the total weight of the KOH/NaOH eutectic formulation and the MgO binder; the weighing and all subsequent operations are performed in a dry room. The powders are mixed in a roll mill for thirty (30) minutes. After mixing, the mixed KOH/NaOH eutectic-binder powder is transferred to an alumina crucible. The mixed KOH/NaOH eutectic-binder powder is fused at 300° C. for two (2) hours. The fused material is removed, cooled to room temperature, and ground using a mortar and pestle. The ground powder is pressed into a pellet using standard methods.

A silver oxide-electrolyte cathode is prepared by mixing the above KOH/NaOH eutectic formulation (without the binder) and a silver oxide powder. Thirty (30) wt % of the KOH/NaOH eutectic formulation, as non-fused powder, is added to powdered silver oxide. The weight percent of the KOH/NaOH eutectic is based on the total weight of the KOH/NaOH eutectic and the silver oxide powder. Mixing is performed in a roll mill for thirty (30) minutes, and the mixed powder is pressed into a pellet using standard methods.

Figure 2:
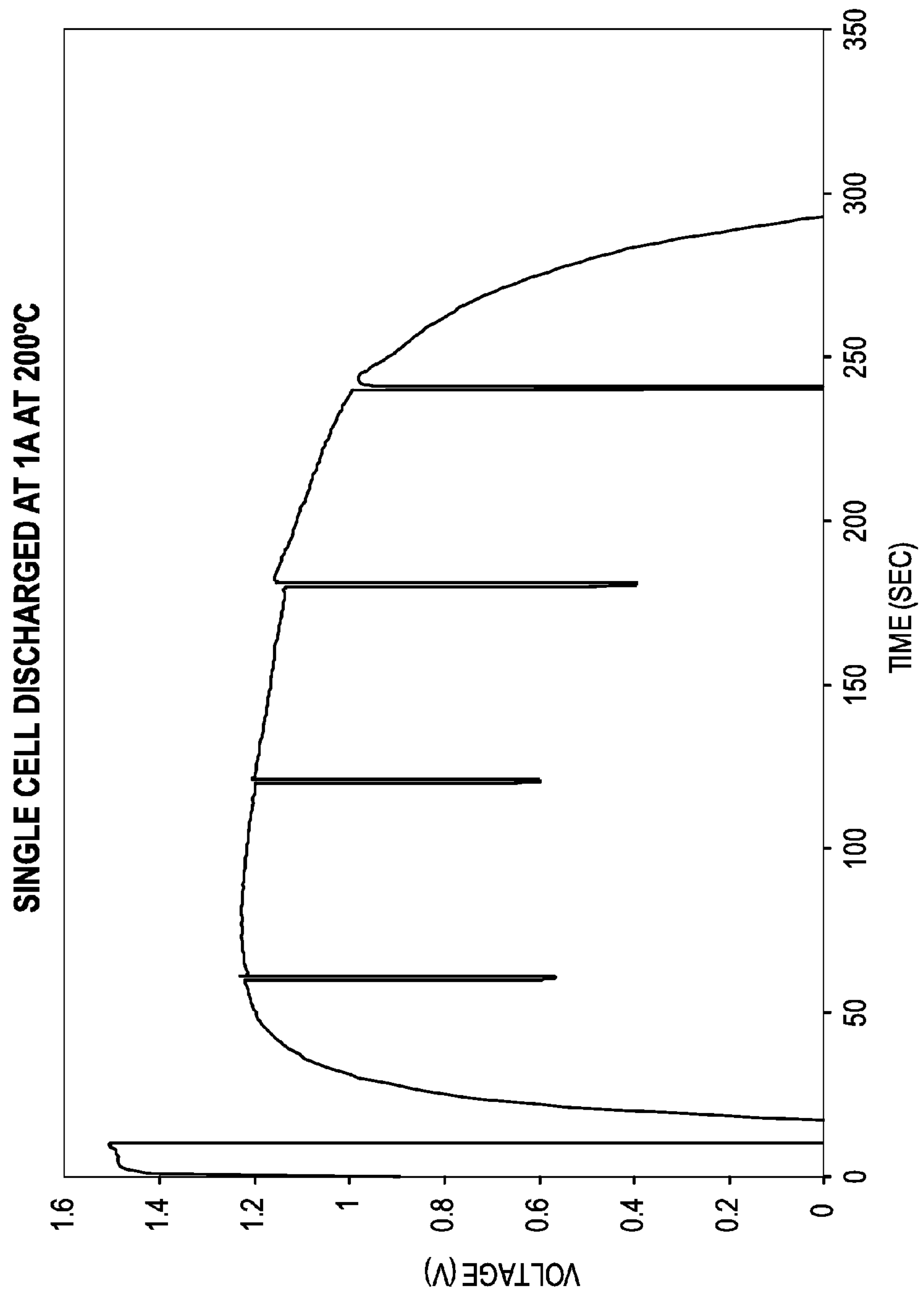
FIG. 2 illustrates a voltage trace diagram of a thermal battery cell according to an embodiment at 1.0 A and 200° C.

A single cell test is performed using a standard SOZ zinc anode on a metal grid, the pressed electrolyte-separator pellet, and the pressed silver oxide cathode pellet. The cell was placed into an inert atmosphere glove box between two heated platens at 200° C. FIG. 2 shows the discharge profile of the single cell according to this example. The cell has an initial voltage dip when current is applied, dropping from the OCV (open circuit voltage) of ~1.5V to negative, before recovering and running at 1 A base load at ~1.2V for nearly five (5) minutes, with 5 A pulses every sixty (60) seconds.

Example 2

Voltage Trace for a Cell Having an Electrolyte-Separator, Anode, and Cathode Comprising a KOH and NaOH Eutectic Formulation A single cell is created using a eutectic formulation of KOH and NaOH with the ratio used in Example 1. The electrolyte-separator was prepared in the same manner as the electrolyte separator of Example 1 with the exception that the MgO binder was present at 45 wt % relative to the total weight of the KOH/NaOH eutectic formulation; the weighing and all subsequent operations are performed in a dry room.

The cathode used in this example is formed in the same manner as the cathode of Example 1, except that the silver oxide powder is mixed with 20 wt % of the unfused KOH/NaOH eutectic relative to the total weight of the KOH/NaOH eutectic and the silver oxide.

The anode is prepared by mixing powdered zinc with 15 wt % of the unfused eutectic formulation of KOH and NaOH of Example 1 relative to the total weight of the KOH/NaOH eutectic and the zinc. Mixing is performed in a roll mill for thirty (30) minutes, and the mixed powder is pressed into a pellet using standard methods.

Figure 3:
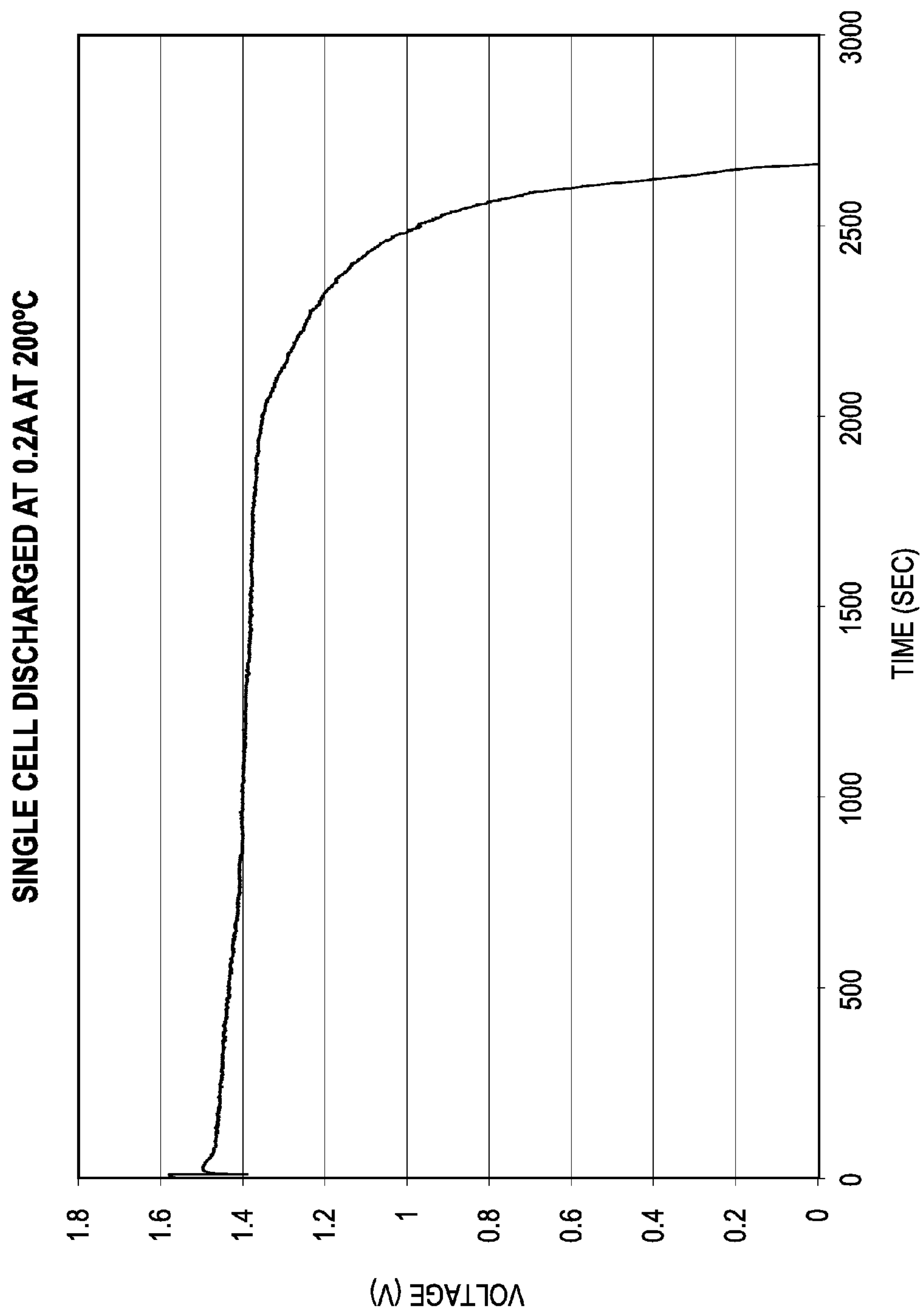
FIG. 3 illustrates a voltage trace diagram of a thermal battery cell according to an embodiment at 0.2 A and 200° C.

In accordance with the single cell test, the cell stack is heated to a temperature of 200° C. under compression to hold the pellets in contact with one another. A current draw of 0.2 A is applied. FIG. 3 shows the discharge profile of the single cell according to this example. The single cell ran above ~1.2V for approximately 2,300 seconds. The single cell test did not short or experience an abnormally abbreviated life, which indicates the utility of the electrolyte to serve as an electrolyte-separator pellet in a thermal battery.

Various principles of the disclosure have been described in illustrative embodiments. However, many combinations and modifications of the above-described formulations, proportions, elements, materials, and components used in the practice of the disclosure, in addition to those not specifically described, may be varied and particularly adapted to specific environments and operating requirements without departing from those principles. Other variations and modifications of the present disclosure will be apparent to those of ordinary skill in the art, and it is the intent that such variations and modifications be covered by this disclosure.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. An electrolyte-separator comprising:

an electrolyte material comprising a eutectic formulation of KOH and NaOH; and a binder;

wherein the electrolyte material is in a solid state at ambient temperatures; the electrolyte material has a melting point of about 180° C. to about 290° C.; and a ratio of KOH to NaOH in the eutectic formulation of KOH and NaOH is from about 40:60 wt % to about 65:35 wt %.

2. The electrolyte-separator according to claim 1, wherein the binder is selected from the group consisting of MgO, $Y_2O_3$, $Al_2O_3$, BN, AIN, fumed silica, and kaolin.

3. The electrolyte-separator according to claim 1, wherein the binder is MgO.

4. The electrolyte-separator according to claim 1, wherein the electrolyte-separator comprises at least about 20 wt % binder relative to the total weight of the electrolyte-separator.

5. The electrolyte-separator according to claim 1, wherein the electrolyte-separator is a homogenous mixture of the eutectic formulation of KOH and NaOH and binder.

6. A composite electrode-electrolyte comprising:
a cathode material or an anode material;
an electrolyte material comprising a eutectic formulation of KOH and NaOH; and
a binder,
wherein:
the electrolyte material is in a solid state at ambient temperatures; the electrolyte material has a melting point of about 180° C. to about 290° C.; and
a ratio of KOH to NaOH in the eutectic formulation of KOH and NaOH is from about 40:60 wt % to about 65:35 wt %.

7. The composite electrolyte-electrolyte according to claim 6, wherein the ratio of KOH to NaOH in the eutectic formulation of KOH and NaOH is about 57:43 wt %.

8. The composite electrode-electrolyte according to claim 7, comprising the cathode material, the cathode material being silver oxide.

9. The composite electrode-electrolyte according to claim 7, comprising the anode material, the anode material being zinc or zinc oxide.

10. The composite electrode-electrolyte according to claim 6, comprising the cathode material, the cathode material being a metal oxide.

11. The composite electrode-electrolyte according to claim 10, wherein the cathode material is selected from the group consisting of silver oxide, lead dioxide, and manganese dioxide.

12. The composite electrode-electrolyte according to claim 11, wherein the cathode material is silver oxide.

13. The composite electrode-electrolyte according to claim 11, wherein the composite electrode-electrolyte comprises at least about 15 wt % of the eutectic formulation relative to the total weight of the electrode-electrolyte.

14. The composite electrode-electrolyte according to claim 6, comprising the anode material, the anode material being zinc or zinc alloy.

15. The composite electrode-electrolyte according to claim 14, wherein the composite electrode-electrolyte comprises about 10 wt % of the eutectic formulation relative to the total weight of the electrode-electrolyte.

16. A battery comprising:
an anode material;
a cathode material; and
an electrolyte-separator comprising:
an electrolyte material comprising a eutectic formulation of KOH and NaOH; and
a binder,
wherein:
the electrolyte material is in a solid state at ambient temperatures;
the electrolyte material has a melting point of about 180° C. to about 290° C.;
and
a ratio of KOH to NaOH in the eutectic formulation of KOH and NaOH is from about 40:60 wt % to about 65:35 wt %.

17. The battery according to claim 16, wherein a ratio of KOH to NaOH in the eutectic formulation of KOH and NaOH is about 57:43 wt %.

18. The battery according to claim 16, wherein the binder is selected from the group consisting of MgO, $Y_2O_3$, $Al_2O_3$, BN, AIN, fumed silica, and kaolin.

19. The battery according to claim 16, wherein the binder is MgO.

20. The battery according to claim 16, wherein the electrolyte-separator comprises about 20 to about 35 wt % binder relative to the total weight of the electrolyte-separator.

21. The battery according to claim 16, wherein the cathode material comprises:
a eutectic formulation of KOH and NaOH;
at least one compound selected from the group consisting of silver oxide, lead dioxide, and manganese dioxide; and an optional binder.

22. The battery according to claim 21, wherein the at least one compound is silver oxide.

23. The battery according to claim 21, wherein the cathode comprises about 15 wt % of the eutectic formulation relative to the total weight of the cathode.

24. The battery according to claim 21, wherein the anode material comprises:
a eutectic formulation of KOH and NaOH;
zinc or zinc alloy; and
an optional binder.

25. The battery according to claim 24, wherein
a ratio of KOH to NaOH in the eutectic formulation of KOH and NaOH is about 57:43 wt %,
the cathode comprises about 15 wt % of the eutectic formulation to the total weight of the cathode,
the anode comprises about 10 wt % of the eutectic formulation relative to the total weight of the anode.

26. The battery according to claim 16, wherein the anode material comprises:
a eutectic formulation of KOH and NaOH;
zinc or zinc alloy; and
an optional binder.

27. The battery according to claim 26, wherein the anode comprises about 10 wt % of the eutectic formulation relative to the total weight of the anode.

* * * * *